(12) United States Patent
Raso et al.

(10) Patent No.: US 10,677,765 B2
(45) Date of Patent: Jun. 9, 2020

(54) STRUCTURAL HEALTH MONITORING OF CYCLICALLY LOADED STRUCTURES

(71) Applicant: HONEYWELL INTERNATIONAL INC., Morris Plains, NJ (US)

(72) Inventors: Peter Raso, Brno (CZ); Cenek Sandera, Brno (CZ); Radek Hedl, Okres Blansko (CZ)

(73) Assignee: Honeywell International Inc., Morris Plains, NJ (US)

( * ) Notice: Subject to any disclaimer, the term of this patent is extended or adjusted under 35 U.S.C. 154(b) by 206 days.

(21) Appl. No.: 15/838,847

(22) Filed: Dec. 12, 2017

(65) Prior Publication Data
US 2019/0178852 A1 Jun. 13, 2019

(51) Int. Cl.
| | | |
|---|---|---|
| *F03D 17/00* | (2016.01) | |
| *G01N 29/24* | (2006.01) | |
| *G01N 29/44* | (2006.01) | |
| *G01N 29/04* | (2006.01) | |
| *F03D 7/04* | (2006.01) | |

(Continued)

(52) U.S. Cl.
CPC ....... *G01N 29/4427* (2013.01); *F03D 1/0658* (2013.01); *F03D 7/0224* (2013.01); *F03D 7/043* (2013.01); *F03D 17/00* (2016.05); *G01N 29/043* (2013.01); *G01N 29/14* (2013.01); *G01N 29/245* (2013.01); *G01N 29/2437* (2013.01);
(Continued)

(58) Field of Classification Search
CPC .. G01N 29/4427; G01N 29/14; G01N 29/245; G01N 29/043; G01N 2291/2693; G01N 29/106; G01N 29/2437; F03D 17/00; F03D 17/0224; F03D 17/043; F03D 1/0658; F05B 2260/80
See application file for complete search history.

(56) References Cited

U.S. PATENT DOCUMENTS

| | | |
|---|---|---|
| 4,480,480 A | 11/1984 | Scott et al. |
| 4,901,575 A | 2/1990 | Bohannan et al. |

(Continued)

FOREIGN PATENT DOCUMENTS

WO 2015065873 A2 5/2015

OTHER PUBLICATIONS

Aranguren, G. et al; Ultrasonic wave-based structural health monitoring embedded instrument; AIP Review of Scientific Instruments; Published Online: Dec. 2013.

*Primary Examiner* — Suman K Nath

(57) ABSTRACT

Methods and systems structural health monitoring system for a cyclically loaded structure are provided. The system includes a processor and a memory, and is configured to, in accordance with a data acquisition pattern: acquire raw sensed data from each of the N sensors; convert the raw sensed data into a data packet; store the data packet as a first data packet; acquire raw sensed data from each of the N sensors a second time and store the data packet as a second data packet; identify a scalar deviation between the first data packet and the second data packet; and transmit anomaly information to an external maintenance reasoner when the scalar deviation is determined to exceed a threshold. The data acquisition pattern incorporates a customer specific arrangement of a plurality of piezoelectric (PZT) sensors and sampling the sensors at predetermined angular locations on a circle of rotation associated with the structure.

17 Claims, 6 Drawing Sheets

(51) Int. Cl.
*F03D 1/06* (2006.01)
*F03D 7/02* (2006.01)
*G01N 29/14* (2006.01)

(52) U.S. Cl.
CPC .... *F05B 2260/80* (2013.01); *G01N 2291/106* (2013.01); *G01N 2291/2693* (2013.01)

(56) References Cited

U.S. PATENT DOCUMENTS

| | | | |
|---|---|---|---|
| 6,292,108 B1 | 9/2001 | Straser et al. | |
| 7,117,742 B2 | 10/2006 | Kim | |
| 7,376,519 B2 | 5/2008 | Morin et al. | |
| 7,377,179 B2 | 5/2008 | Anderson | |
| 7,458,266 B2 | 12/2008 | Beard et al. | |
| 7,623,974 B2 | 11/2009 | Cipra | |
| 7,917,311 B2 | 3/2011 | Finkel et al. | |
| 7,987,728 B2 | 8/2011 | Song et al. | |
| 8,015,876 B2 | 9/2011 | El-Bakry et al. | |
| 8,082,115 B2 | 12/2011 | Bechhoefer et al. | |
| 8,285,495 B2 | 10/2012 | Purekar et al. | |
| 8,511,177 B1 | 8/2013 | Makaremi | |
| 9,618,420 B2 | 4/2017 | Wesby et al. | |
| 9,638,671 B2 | 5/2017 | Borigo et al. | |
| 9,777,708 B2 * | 10/2017 | Risager | F03D 7/0224 |
| 2005/0068041 A1 | 3/2005 | Kress et al. | |
| 2009/0246019 A1 | 10/2009 | Volanthen et al. | |
| 2010/0067526 A1 * | 3/2010 | Lovmand | F03D 7/047 370/389 |
| 2011/0158806 A1 | 6/2011 | Arms et al. | |
| 2014/0257624 A1 * | 9/2014 | Safa-Bakhsh | G06F 17/00 701/31.4 |
| 2015/0053009 A1 | 2/2015 | Yan et al. | |
| 2015/0168352 A1 | 6/2015 | Sohn et al. | |
| 2017/0160243 A1 | 6/2017 | Zhang et al. | |
| 2018/0298830 A1 * | 10/2018 | Moroto | F02C 9/28 |

* cited by examiner

STRUCTURAL HEALTH MONITORING OF CYCLICALLY LOADED STRUCTURES

TECHNICAL FIELD

The present invention generally relates to cyclically loaded structures, and more particularly relates to systems and methods for structural health monitoring of wind turbines.

BACKGROUND

Cyclically loaded structures include wind turbines, bearings, bolts, blades, rivets, screws, and the like. As used herein, "cyclically loaded" structures complete a circle of rotation around an axis, and, as they are in operation, they are subjected to variable loading, i.e., an uneven amount of pressure, torque, and resistance at different locations on the circle of rotation. Cyclically loaded structures are vulnerable to several failure modes, such as fatigue cracking, delamination, pitting, corrosion, self-loosening, and accidental damages. These failure modes are of special concern in the wind turbine industry, which is a large and growing business.

Although some of the failure modes may be effectively detected via automatic monitoring systems using well known accelerometers or strain gages, the technical problem of detecting structural damage often requires a technician to be present at the wind turbine. Therefore, regular inspections, performed by a technician, are generally established to monitor damage of sensitive components of the wind turbine.

Accordingly, improvements to Structural Health Monitoring (SHM) systems are desirable. Specifically, technologically improved Structural Health Monitoring (SHM) methods and systems for identifying structural damage are desirable. Furthermore, other desirable features and characteristics of the present disclosure will become apparent from the subsequent Detailed Description and the appended claims, taken in conjunction with the accompanying drawings and this Background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is an embodiment of a structural health monitoring system for a cyclically loaded structure. The system comprising: a sensor switching system (SSS) coupled to receive data requests and configured, in response to each data request, to: (a) acquire raw sensed data from each of N sensors; (b) convert the raw sensed data into a data packet; and (c) transmit the data packet to the sensor control module; a sensor control module, configured to: transmit the data requests to the SSS, the data requests comprising a first data request and a second data request; store a data packet received from the SSS responsive to the first data request as a first data packet; store a data packet received from the SSS responsive to the second data request as a second data packet; identify a scalar deviation between the first data packet and the second data packet; and transmit anomaly information to an external maintenance reasoner when the scalar deviation is determined to exceed a threshold.

A method for damage detection in a cyclically loaded structure is also provided. The method comprising: at a sensor switching system (SSS) coupled to receive data requests and configured, in response to each data request, to: (a) acquiring raw sensed data from each of N sensors; (b) converting the raw sensed data into a data packet; and (c) transmitting the data packet to the sensor control module; and at a sensor control module; transmitting a data requests to the SSS; storing a data packet received from the SSS responsive to the data request; extracting a signal feature from the data packet; and transmitting an alert and anomaly information to an external maintenance reasoner based on comparing the extracted signal feature to a threshold.

Also provided is a wind turbine. The wind turbine, comprising: N sensors arranged on the wind turbine; and a structural health monitoring system comprising a processor and a memory. The structural health monitoring system configured to: in accordance with a data acquisition pattern, (a) acquire raw sensed data from each of the N sensors; (b) convert the raw sensed data into a data packet; (c) store the data packet as a first data packet; (d) repeat (a) and (b), and store the data packet as a second data packet; (e) identify a scalar deviation between the first data packet and the second data packet; and (f) transmit anomaly information to an external maintenance reasoner when the scalar deviation is determined to exceed a threshold.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any theory presented in the preceding background or the following detailed description.

Figure 3:
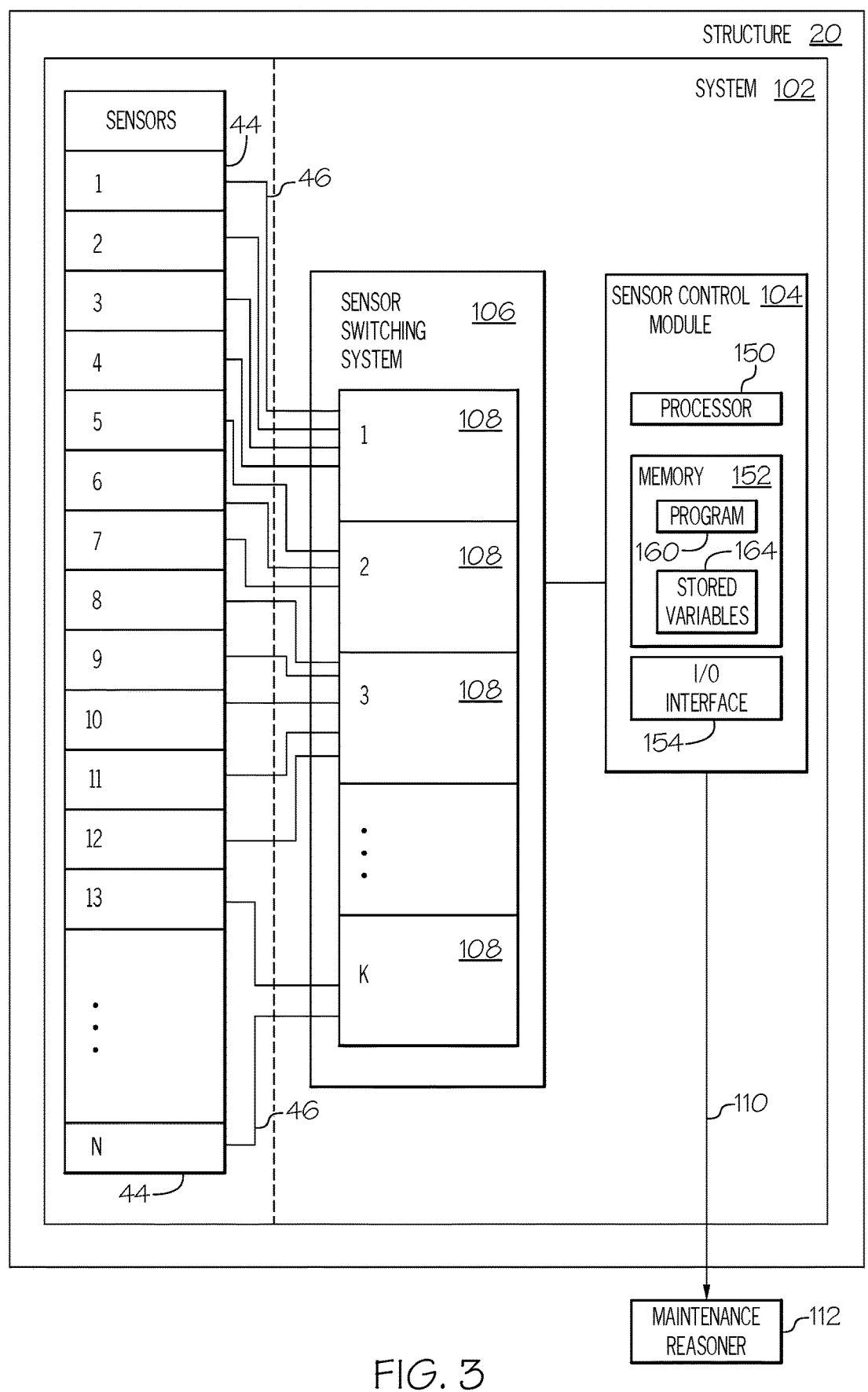
FIG. 3 is a block diagram of structural health monitoring system for a cyclically loaded structure, in accordance with an exemplary embodiment.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method may take the form of a control module (FIG. 3, 104).

The provided health monitoring system 102 (FIG. 3) is an enhanced structural health monitoring system directed to the technical problem of detecting structural defects. The provided health monitoring system 102 provides a number of technical benefits, such as: detecting structural defects, including those that are sub-surface, not visible to a human eye, and at inaccessible locations; operating automatically and continuously; operating without stopping rotation of the structure it is monitoring; operating without requiring a technician present; and, operating without requiring a user to trigger its operation. In coordination with the external maintenance reasoner 112 (FIG. 3) the health monitoring system 102 supports further processing, generation of maintenance schedules and reports, and generation of operational histories. Accordingly, the provided enhanced health monitoring system 102 increases the scope of health monitoring over other methods. Moreover, the provided health monitoring system 102 is customizable to individual customer defect requirements, thereby reporting only cracks of concern, further increasing efficiency and decreasing cost of the asset operation and maintenance. The concepts presented herein are scalable and adaptable to wind farms or other large scale fleets of wind turbines 20. The concepts presented herein can also be deployed in a variety of other cyclically loaded structure applications, such as detecting self-loosening of bolts, corrosion, and fatigue cracking of blades, rivets, screws, and the like. The health monitoring system 102 and its functions are further described below.

Figure 1:
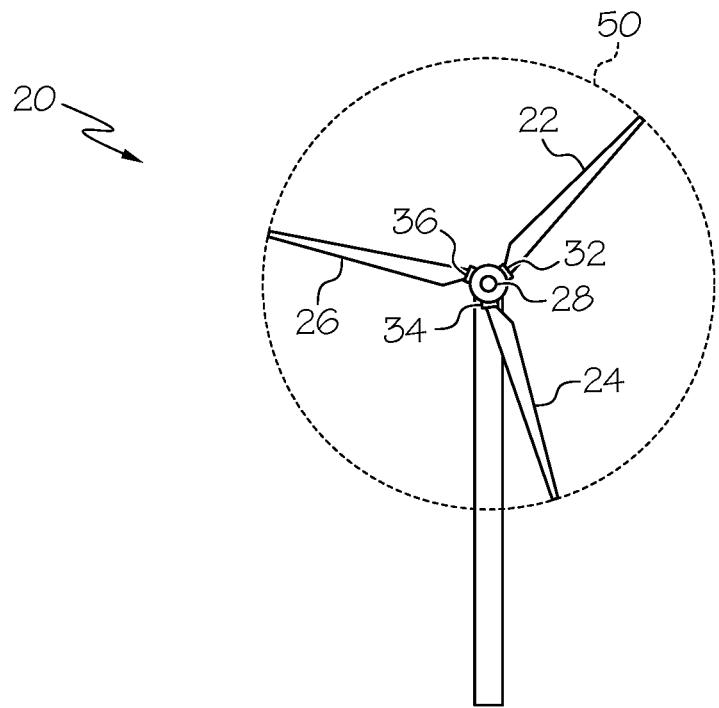
FIG. 1 is an illustration of a wind turbine, in accordance with an exemplary embodiment.
Figure 2:
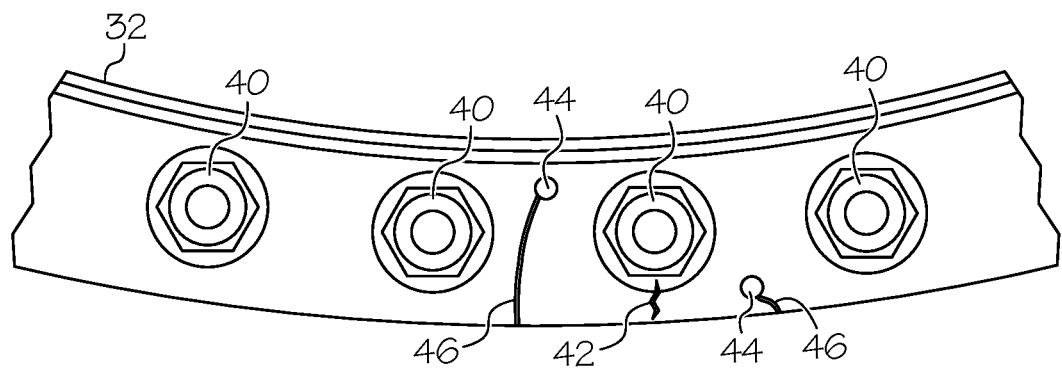
FIG. 2 is an illustration of a part of pitch bearing, as may be found on a wind turbine, in accordance with an exemplary embodiment.

In FIG. 1, a cyclically loaded structure, in the form of a wind turbine 20, is illustrated. The wind turbine 20 comprises three blades, 22, 24, and 26; however, other numbers of blades are supported. The blades (22, 24, and 26) are operationally attached to the wind turbine 20. In various embodiments, attachment is achieved via one or more pitch bearings (32, 34, and 36). As shown in FIG. 2, each pitch bearing (32, 34, and 36) may comprise fastening means, such as one or more screws 40. During operation, the blades (22, 24, and 26) complete a circle 50 of rotation around an axis 28. Over time, various components of wind turbines exhibit the failure modes described above, and in particular, variable loading on the blades (22, 24, and 26) may cause structural damage, such as stress fractures and cracks 42 to develop, often on the pitch bearings (32, 34, and 36), and around the fastening means.

In order to detect the presence of a crack 42, the present health monitoring system 102 manages the inducing and sensing of ultrasonic guided waves (UGW) by sensors 44 (FIG. 3) placed in/around vulnerable areas, and processes the acquired sensed data therefrom. The UGW interact with the damage in the material on which they are placed. When present, cracks 42 alter the UGW in a predictable and measurable way. Specifically, as a crack 42 opens and closes, or simply continues to grow, the UGW changes accordingly. In various embodiments, the sensors 44 comprise piezoelectric (PZT) sensor/actuators. Connectors 46 may provide wired or wireless routing of acquired raw sensed data to the other components of the health monitoring system 102 (FIG. 3).

Turning now to FIG. 3, and with continued reference to FIGS. 1-2, a functional block diagram of a cyclically loaded structure (wind turbine 20) including N sensors 44, and the health monitoring system 102 (also referred to herein as "system" 102) is shown. These functional blocks are described in more detail below.

A plurality (N) of sensors is placed around the cyclically loaded structure 20 to detect structure damage, such as fatigue cracks, during operation. The N sensors 44, their type, and their specific locations are in accordance with a novel sensor arrangement. The sensor arrangement is informed by customer defect requirements, and is part of an overall customer specific data acquisition pattern. For example, a first customer may be able to tolerate larger cracks 42, for example, up to a half meter long. Another customer may only be able to tolerate cracks 42 that are less than or equal to 5 millimeters long. The first customer's application, therefore, requires fewer sensors 44, spaced farther apart, whereas the second customer's application requires many sensors 44, placed close together. The sensor arrangement may be computer generated, employing various materials loading models and device dimensions for a given structure 20. The N sensors 44 are coupled via connectors 46 to the system 102. The N sensors respond to an excitation signal pulse or inducement from an actuator. In some embodiments, such as those using PZT technology, the actuator and sensors are integrated elements. As used herein, the data request that is transmitted from the system 102 to the N sensors 44 is understood to be a custom signal pulse required to induce the particular sensors of the N sensors 44 to sense data.

The system 102 performs the function of acquiring raw sensed data from the N sensors 44. As used herein, acquiring raw sensed data from the N sensors 44 comprises, (i) generating a data request as described above, and (ii) receiving, responsive thereto, the respective raw sensed data from the N sensors 44. The system 102 also performs the tasks of pre-processing of sensed data, digitizing sensed data, processing sensed data, generating damage indicators representative of the sensed data, extracting relevant signal features from damage indicators (such as generating a loading signal therefrom and extracting a maximum amplitude, a location of the maximum amplitude, one or more phase shifts, etc), comparing damage indicators, identifying scalar deviations between damage indicators, and comparing the scalar deviations to thresholds to generate alerts and generating related anomaly identification when thresholds have been exceeded. In various embodiments, the system 102 determines damage indicator variability as a scalar number. Anomalies (potential structural damage) are identified when a scalar deviation exceeds a respective threshold. When an anomaly is identified, health monitoring system 102 transmits anomaly information to an externally located maintenance reasoner 112. Anomaly information may comprise an alert that a crack having a critical crack length has occurred, and a predicted defect location of the crack. In some embodiments, the system 102 may further estimate a defect size. Because the provided health monitoring system 102 identifies the anomalies and anomaly information based on only comparative scalar numbers, it does not require defect-free baseline measurements, older reference signals, or adjustments for environmental conditions.

In other embodiments, the first data packet and the second data packet are received by the external maintenance reasoner 112. In these embodiments, the external maintenance reasoner 112 performs the functions of: identify a scalar deviation between the first data packet and the second data packet; and transmit anomaly information to an external maintenance reasoner when the scalar deviation is determined to exceed a threshold.

Figure 4:
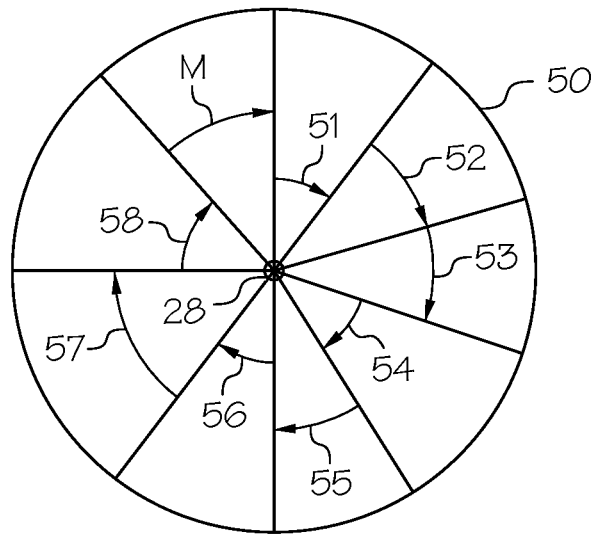
FIGS. 4-5 are illustrations depicting data acquisition in accordance with an exemplary embodiment.
Figure 5:
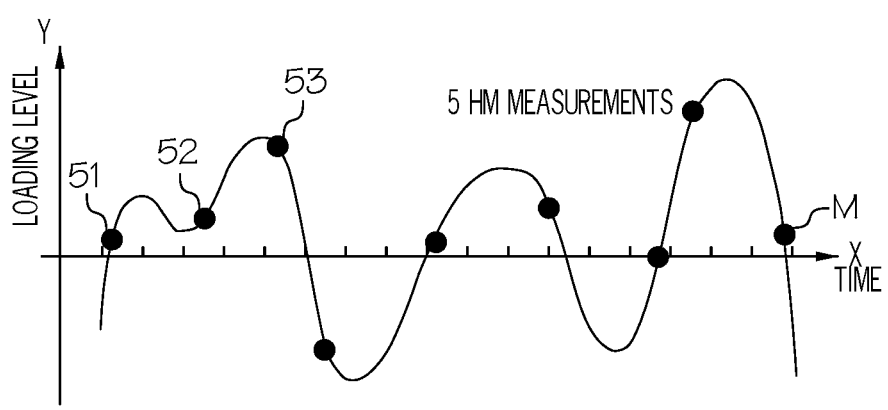

Acquiring the raw sensed data in accordance with the data acquisition pattern enables the system 102 to make the determinations described herein. With reference to FIGS. 4 and 5, the data acquisition pattern may additionally be a function of the anticipated loading variations as a structure rotates around the circle 50 of rotation. For example, the data acquisition pattern may comprise a predetermined number, M, of specific angular locations on the circle 50 of rotation at which to take data. The M locations may also be specific loading locations related to monitoring performed by other auxiliary sensors (not shown), such as strain gage. M may be selectively based on any combination of: (i) the customer's defect requirements, (ii) anticipated maximum structural loading levels for a blade as it rotates, and (iii) anticipated minimum structural loading levels for the blade as it rotates. The M angles corresponding to the M angular locations do not have to be equal to one another, but they add up to 360 degrees, completing the circle 50 of rotation. In FIG. 4, angles 51, 52, 53, 54, 55, 56, 57, 58, and M are depicted.

In FIG. 5, an example of a data collection scenario from one of the N sensors 44 is graphed over one complete rotation. Time is depicted on the X axis. One data point (of raw sensed data) is received at each time associated with one of the M points (51, 52, 53 . . . M). The Y axis is a variable structure loading level, generally depicted in units of voltage. The Y axis shows how the UGW signal received by the sensors is affected by its loading level as the structure rotates. The data points may be connected and graphed; as used herein, this is referred to as graphing a data packet as a loading signal, and the resulting graph is referred to as a "loading signal."

Putting the M and N concepts together, at each of the M locations on the circle 50 of rotation, raw sensed data may be acquired by each of the N sensors 44. Accordingly, in various embodiments, during operation of the provided health monitoring system 102, each complete 360 rotation may acquire M×N raw sensed data as described in FIGS. 4 and 5. In other embodiments, data acquisition from the N sensors 44 is random (i.e., not tied to M angular locations in rotation), but then processing performed at the sensor control module 104 distinguishes between the acquired data from the N sensors 44 and makes the determinations described herein. It is to be understood that the herein described data acquisitions occur in a short amount of time, such as, less than or equal to thirty minutes from each other, in order to avert needing to compensate for variations in environmental effects.

The processing activities, data conversions, and data translations that are the functions of the health monitoring system 102 may be performed by a sensor switching system (SSS) 106 cooperatively coupled to a sensor control module 104 (also referred to herein as "control module" 104). Communication between the sensor switching system 106 and the sensor control module 104 may be wired or wireless. In various embodiments, the sensor switching system 106 is at least partially integrated with the sensor control module 104; therefore, in various embodiments, a processing engine formed by a processor 150 and a memory 152 within sensor control module 104 perform the tasks and processes collectively attributed to the system 102. The operation of these functional blocks is described in more detail below.

Figure 6:
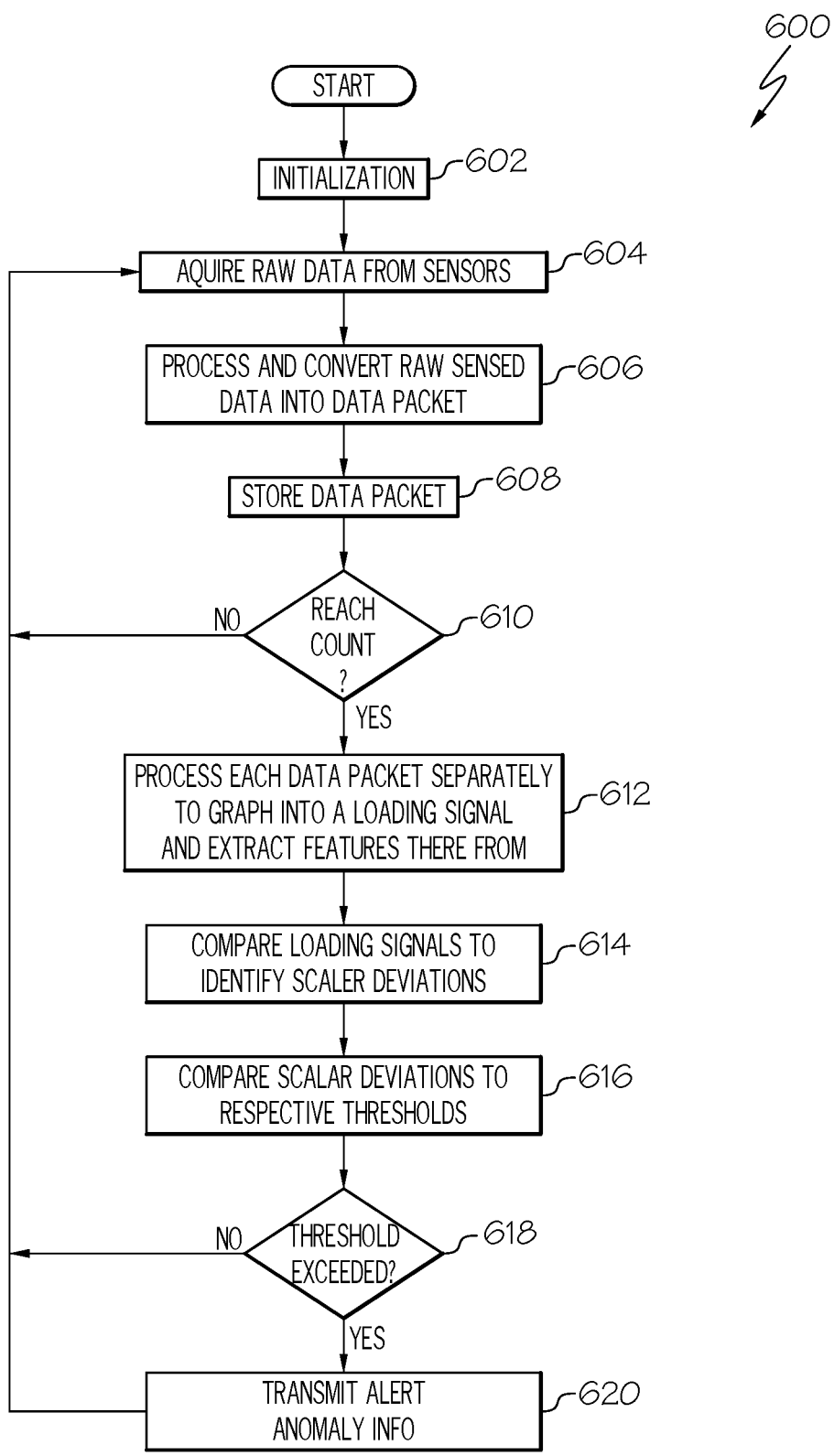
FIG. 6 is a flow chart of a process for structural health monitoring, in accordance with an exemplary embodiment.

As mentioned, the functions of the health monitoring system 102 may be performed by the control module 104. In doing so, the control module 104 may execute the steps of a method 600, as shown in the flow chart of FIG. 6. For illustrative purposes, the following description of method 600 may refer to elements mentioned above in connection with FIG. 3. In practice, portions of method 200 may be performed by different components of the described system. It should be appreciated that method 600 may include any number of additional or alternative tasks, the tasks shown in FIG. 6 need not be performed in the illustrated order, and method 600 may be incorporated into a more comprehensive procedure or method having additional functionality not described in detail herein. Moreover, one or more of the tasks shown in FIG. 6 could be omitted from an embodiment of the method 600 as long as the intended overall functionality remains intact.

In some embodiments, the control module 104 may be responsible only for the functions of: transmitting to the sensor switching system 106, data requests; storing data packets received from the sensor switching system 106 responsive to the data requests and transmitting the stored data to the maintenance reasoner 112. In these embodiments, the remaining data processing and anomaly detection is done by the maintenance reasoner 112.

The method starts, and at 602 the control module 104 is initialized. As mentioned above, initialization may comprise uploading or updating instructions and applications in the program 160, stored variables 164, and the various lookup tables stored in the database 156. Examples of parameters that may be stored in stored variables 164 include parameters used by the program 160 (for example, a predetermined thresholds, the pattern of N sensors 44, a predetermined count for comparing loading signals, and text and formatting information used for alerts).

The sensor switching system 106 acquires (at 604) raw sensed data from each of N sensors 44 responsive to data requests from the control module 104. Generally, the sensor switching system 106 responds to each data request by (a) acquiring raw sensed data from each of N sensors; (b) converting the raw sensed data into a data packet; and (c) transmitting the data packet to the sensor control module 104. More specifically, the sensor switching system 106 performs a variety of pre-processing activities on the raw sensed data at 606, such as, any of the steps including: digitizing the raw sensed data, formatting the digitized data for wired or wireless transmission into a data packet, and performing data compression methods. In various embodiments, the data packets generated by the sensor switching system 106 may also include multiple measurements of a relevant signal feature (defined above) made during one rotation (such as, maximum amplitude, location of maximum amplitude, phase shifts, etc.) Subsequent to the pre-processing activities, the sensor switching system 106 transmits the data packet to the control module 104 for storage (at 608) and use in further processing. In this manner, the sensor switching system 106 may reduce the communication traffic to, and increase the processing efficiency of, the control module 104.

The control module 104 performs the functions of: transmitting, to the sensor switching system 106, the data requests used at 604; and receiving and storing (at 608) data packets received from the sensor switching system 106 responsive to the data requests. When a predetermined "count" or number of data packets is received, the control module 104 may perform additional processing at 612. The processing at 612 includes performing feature extraction (decomposing raw sensed signals into relevant signal features attributed to structural damage) on the data packets at 612; identifying a scalar deviation between the data packets (using either raw signals or extracted signal features) at 614; and transmitting alerts and anomaly information to the external maintenance reasoner (at 620) when the scalar deviation is determined to exceed a respective threshold at 618.

The method 600 may repeat for each of M times, to complete one complete rotation of the wind turbine. The method may further be repeated as part of the performance of the presented health monitoring system 102.

As alluded to, the control module 104 includes a processor 150 communicatively coupled to a memory 152 and an I/O interface 154. The processor 150 and the memory 152 form a processing engine that performs the processing activities, data conversion, and data translation that result in the functions of the system 102, as is described herein. As mentioned, in some embodiments, the sensor switching system 106 is at least partially integrated with the sensor control module 104; therefore, the tasks and processes attributed to the sensor switching system 106 may also be performed by the processing engine formed by processor 150 and the memory 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

The memory 152 maintains data bits and may be utilized by the processor 150 as both storage and a scratch pad. The memory locations where data bits are maintained are physical locations that have particular electrical, magnetic, optical, or organic properties corresponding to the data bits. The memory 152 can be any type of suitable computer readable storage medium. For example, the memory 152 may include various types of dynamic random access memory (DRAM) such as SDRAM, the various types of static RAM (SRAM), and the various types of non-volatile memory (PROM, EPROM, and flash). In certain examples, the memory 152 is located on and/or co-located on the same computer chip as the processor 150. In the depicted embodiment, the memory 152 stores the above-referenced instructions and applications of a program 160 (described in more detail below) along with one or more configurable variables in stored variables 164. Information in the memory 152 may be organized and/or imported from an external source, such as the maintenance reasoner 112 during an initialization step of a process, such as process 600 shown in FIG. 6.

The control module 104 employs the input/output (I/O) interface 154 to manage transmission of programs, data, status and other information or signals between and among the various components of the control module 104, components of the system 102, and the maintenance reasoner 114. The input/output (I/O) interface 154 can include one or more network interfaces (wired or wireless) and can be implemented using any suitable method and apparatus. For example, the I/O interface 154 enables communication from a system driver and/or another computer system. In one embodiment, the I/O interface 154 obtains data from maintenance reasoner 112 directly. The I/O interface 154 may also include one or more network interfaces to communicate with technicians, and/or one or more storage interfaces to connect to storage apparatuses, such as the memory 152. The control module 104 and communications link 110 embody one or more industry-standard wireless communication protocols as required to communicate with the maintenance reasoner 112. In this regard, the control module 104 may employ a radio communication system and/or another suitable data link system. The control module 104 and communications link 110 may also embody wired and direct communication protocols that may be used in an initialization step, in which parameters and executable programs are loaded into respective components of the system 102.

Specifically embodied in program 160 is a novel variability algorithm and associated materials loading models utilized in the operation of the health monitoring system 102 as described herein. During operation, the processor 150 loads and executes the one or more programs, algorithms, rules, instructions and applications embodied as the program 160 and, as such, controls the general operation of the control module 104 as well as the system 102.

In an example, the data requests comprise, at least, a first data request and a second data request. The control module 104 stores a data packet received from the sensor switching system 106 responsive to the first data request as a first data packet. The control module 104 stores a data packet received from the sensor switching system 106 responsive to the second data request as a second data packet. In some embodiments, the control module 104 identifies a scalar deviation between the first data packet and the second data packet by (i) graphing the first data packet as a first loading signal, (ii) graphing the second data packet as a second loading signal, and (iii) comparing the first loading signal and the second loading signal. Generally, comparing loading signals includes identifying scalar deviations between them, and comparing the identified scalar deviations to respective thresholds. The threshold referred to may be one of several thresholds, for example there may be at least one threshold in the Y direction, and at least one threshold in the X direction. In practice, the thresholds may be voltage differences that represent a tolerance in a damage indicator associated with a location of a sensor 44. In some embodiments, the thresholds used are developed based on multiple signal features). Moreover, other signal comparison methods may be employed, such as is described in connection with FIG. 9.

Figure 7:
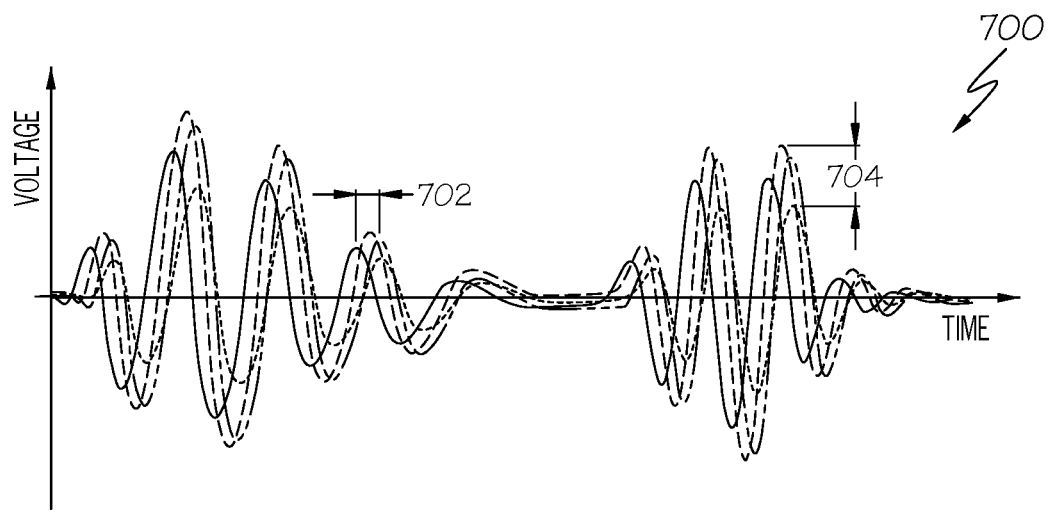
FIG. 7 is a loading signal image showing damage present in the wind turbine, in accordance with an exemplary embodiment.
Figure 8:
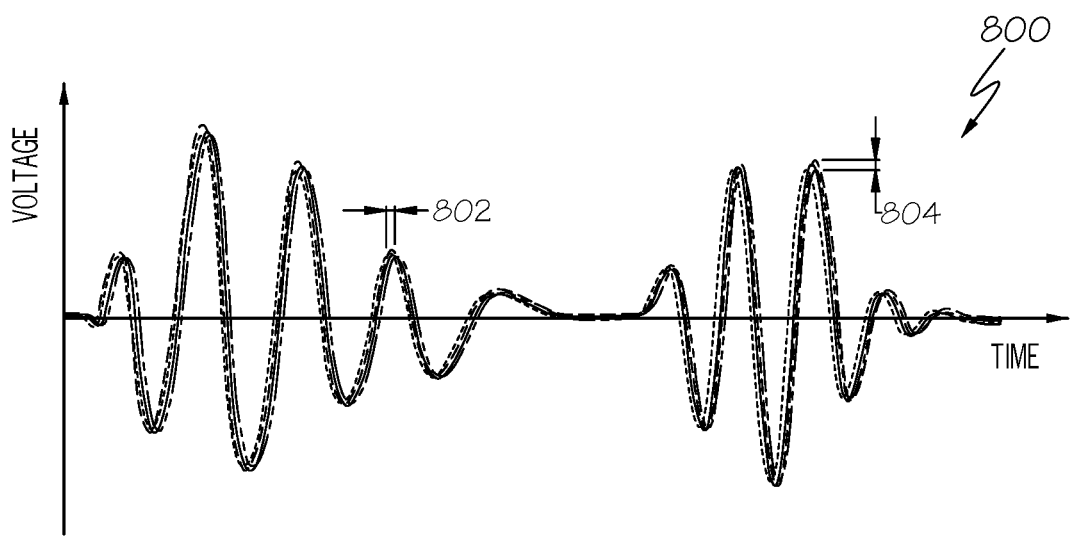
FIG. 8 is a loading signal image showing a healthy wind turbine, in accordance with an exemplary embodiment.
Figure 9:
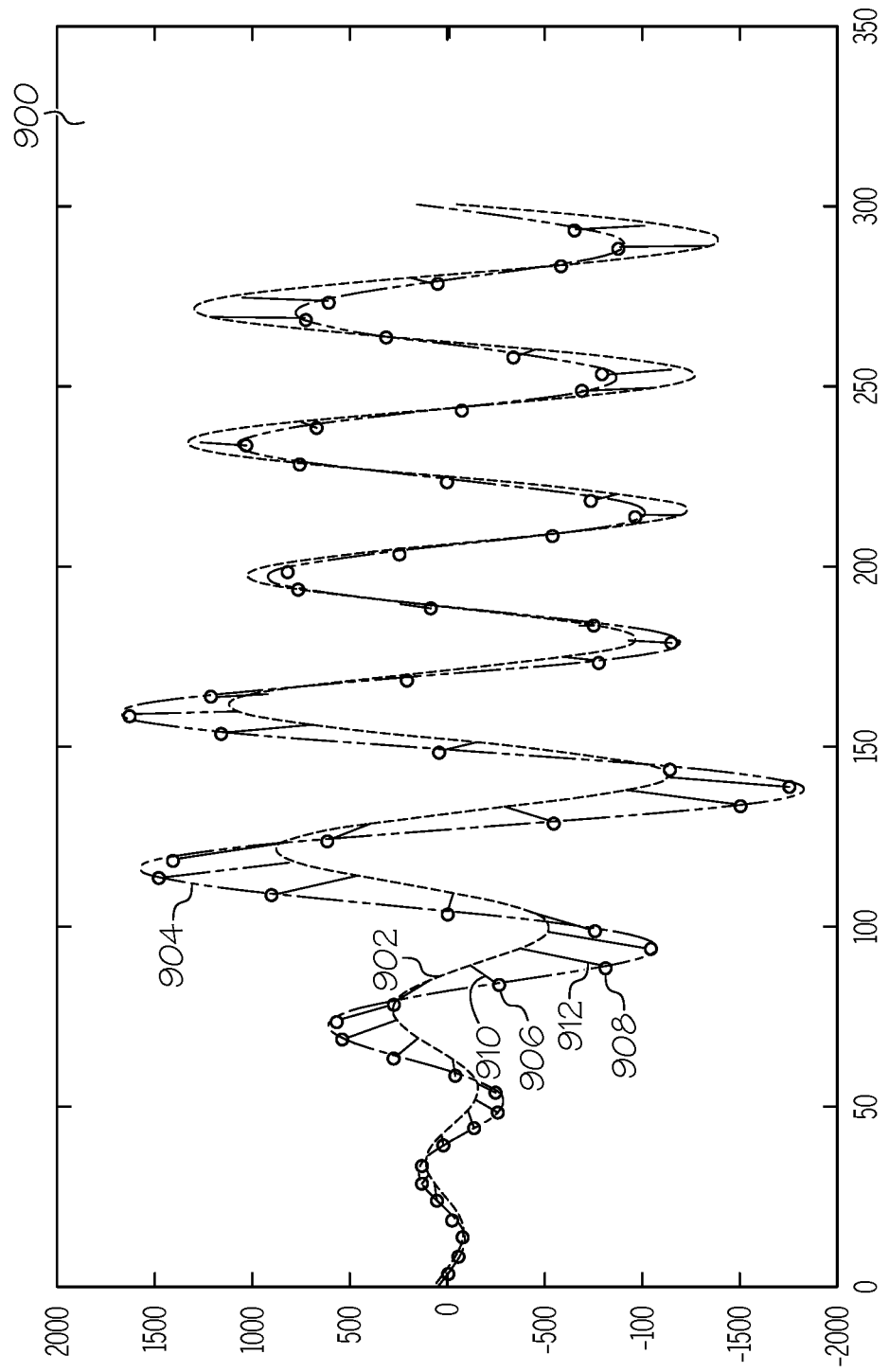
FIG. 9 is a loading signal image showing a signal evaluation method using signal decomposition into vectors, in accordance with an exemplary embodiment.

Turning now to FIGS. 7-9, with continued reference to FIGS. 1-6, scalar deviations and anomalies are illustrated and described. When damage is not present, the loading signals do not change much over time; i.e., the first loading signal and the second loading signal vary by less than or equal to a respective threshold. When damage is present, loading signal spread is noticeable; i.e., the first loading signal and the second loading signal by more than the threshold.

In FIG. 7, a plurality of signals is graphed 700, and the signal spread is noticeable. A scalar deviation 702 in the X direction and a scalar deviation 704 in the Y direction are identified. In this example, the scalar deviation 704 in the Y direction is determined to have exceeded a Y threshold, and the scalar deviation 702 in the X direction is determined to have exceeded an X threshold. Using statistical process control methods, and based on one or more exceedances, the control module 104 determines that there is an anomaly that is likely to be damage, such as a crack 42. In contrast, in FIG. 8, a plurality of signals is graphed 800, and the signals do not change much over time. A scalar deviation 804 in the Y direction and a scalar deviation 802 in the X direction are shown. The scalar deviation 804 in the Y direction is determined not to have exceeded a Y threshold, and the scalar deviation 802 in the X direction is determined not to have exceeded an X threshold. In FIG. 8, the control module 104 determines that not exceeding the threshold(s) indicates a healthy structure 20.

In FIG. 9, another signal evaluation method is illustrated. As mentioned above, variability can be linked to various loading signal features which describe a complex signal change. One method uses signal decomposition into vectors delineating a signal change. Magnitude of signal change can be calculated from individual vectors (circle+line between old and new signal), and these magnitudes are again scalar deviations that may be compared to thresholds. A signal 902 is used as an exemplary first loading signal and a signal 904 is used as an exemplary second loading signal, and they are overlaid on graph 900. On signal 904, circles 906 and 908 are placed at places of measurement. A line is drawn from the first loading signal 902 to the second loading signal 904 at the places of measurement. The lines are indicated at 910 and 912. Signal analysis may comprise vector comparisons of the lines 910 and 912.

To increase modularity of the system 102, the functionality of the sensor switching system 106 may be distributed efficiently around the wind turbine 20. In various embodiments, the sensor switching system 106 may comprise k sensor switching units 108, the k sensor switching units 108 arranged based on the sensor arrangement. Each of the k sensor switching units 108 may be operationally coupled to a respective unique subset of the N sensors 44 (which means that any individual sensor 44 is routed to only one of the k sensor switching units 108). In FIG. 3, a subset of N sensors (sensors 1-4) are coupled to sensor switching unit 1, a subset of N sensors (sensors 5-7) are coupled to sensor switching unit 2, etc. Each of the k sensor switching units 108 (i) acquires raw sensed data from its subset of N sensors, (ii) converts its raw sensed data into a respective sub-data packet; and (iii) transmits its sub-data packet to the processor. Each sub-data packet is a non-redundant part of a data packet described above.

In summary, when using the provided health monitoring system 102, the structure 20 does not have to be stopped (from operating) to effectively "inspect" its health status, nor is a technician required to be present at the structure 20 for a health inspection or assessment to be performed. The present system and method provide a more accurate health assessment than a human visual assessment, in part, because it's capable of detecting internal and subsurface cracks. In addition, the external maintenance reasoner 112 may be equipped with vast processing power to collect information, compare information, generate maintenance schedules, and generate diagnostics for a large fleet of wind turbines, automatically and without user input. Accordingly, the exemplary embodiments of a technologically improved health monitoring system 102 deliver technical advantages such as, reduced on-site inspections, reduced cost, optimized operation, optimized maintenance planning, and increased prevention of failures.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A structural health monitoring system for a cyclically loaded structure, the system comprising:
   a sensor switching system (SSS) electronically coupled to N sensors;
   a sensor control module, configured to transmit a first data request and a second data request to the SSS:
   the SSS configured to receive the first data request and the second data request from the sensor control module:
   the SSS configured to, in response to the first data request,
   (a) acquire first raw sensed data from each of the N sensors;
   (b) convert the first raw sensed data into a first data packet; and
   (c) transmit the first data packet to the sensor control module;
   the SSS configured to, in response to the second data request:
   (d) acquire second raw sensed data from each of the N sensors:
   (e) convert the second raw sensed data into a second data packet: and
   (f) transmit the second data packet to the sensor control module:
   the sensor control module configured to:
   store the first data packet received from the SSS responsive to transmitting the first data request; and
   store the second data packet received from the SSS responsive to transmitting the second data request;
   process the first data packet and the second data packet separately to graph into a loading signal and extract signal features there from;
   identify a scalar deviation between the first data packet and the second data packet by comparing the loading signals; and
   when the scalar deviation is determined to exceed a threshold, generate anomaly information related to the scalar deviation, and transmit the anomaly information to an external maintenance reasoner.

2. The system of claim 1, wherein the first data request and the second data request are two of a plurality of data requests, and wherein the sensor control module is further configured to:
   generate the plurality of data requests in accordance with a data acquisition pattern associated with a circle of rotation, the data acquisition pattern comprising M angular locations on the circle of rotation at which to take data.

3. The system of claim 2, wherein the data acquisition pattern further comprises a sensor arrangement defining where the each of the N sensors are located on the cyclically loaded structure, and the data acquisition pattern reflects a customer's defect requirements.

4. The system of claim 3, wherein the anomaly information comprises a defect location on the cyclically loaded structure, and the sensor control module is further configured to determine the defect location responsive to processing the scalar deviation with the data acquisition pattern.

5. The system of claim 4, wherein the anomaly information further comprises an estimated defect size, and the sensor control module is further configured to determine the estimated defect size responsive to processing the scalar deviation with the data acquisition pattern.

6. The system of claim 5, wherein the sensor switching system comprises k sensor switching units, arranged based on the sensor arrangement, each of the k sensor switching units operationally coupled to a respective unique subset of the N sensors, and wherein:
responsive to each request for data, each of the k switching units:
(a) acquires raw sensed data from the unique subset of N sensors;
(b) converts its raw sensed data into a sub-data packet, the sub-data packet being a portion of a data packet; and
(c) transmits its sub-data packet to the sensor control module.

7. The system of claim 6, in which the sensors comprise piezoelectric (PZT) sensors.

8. The system of claim 7, wherein the scalar deviation is a first scalar deviation, and the first data packet is represented by a signal feature created from multiple measurements during one rotation, and wherein the sensor control module is further configured to identify a second scalar deviation based on the multiple measurements during one rotation.

9. A method for damage detection in a cyclically loaded structure, the method comprising:
at a sensor switching system (SSS) electronically coupled to N sensors:
receiving a first data request from a sensor control module; and
responsive to receiving the first data request, acquiring raw sensed data from each of the N sensors, converting the raw sensed data into a first data packet, transmitting the first data packet to the sensor control module; and
receiving a second data request from a sensor control module; and
responsive to receiving the second data request, acquiring raw sensed data from each of the N sensors, converting the raw sensed data into a second data packet, and transmitting the second data packet to the sensor control module;
at the sensor control module:
transmitting the first data request and the second data request;
storing the first data packet received from the SSS responsive to transmitting the first data request;
storing the second data packet received from the SSS responsive to transmitting the second data request;
process the first data packet and the second data packet separately to graph into respective loading signals and extract a signal feature there from;
identify a scalar deviation between the first data packet and the second data packet by comparing the respective loading signals; and
when the scalar deviation is determined to exceed a second threshold, generating anomaly information related to the scalar deviation, and transmitting the anomaly information to the external maintenance reasoner.

10. The method of claim 9, further comprising:
generating the a plurality of data requests at the sensor control module, in accordance with a data acquisition pattern associated with a circle of rotation, the data acquisition pattern comprising M angular locations on the circle of rotation at which to take data.

11. A wind turbine comprising:
N sensors arranged on the wind turbine;
a structural health monitoring system comprising a processor and a memory, and configured to:
(a) acquire, in accordance with a data acquisition pattern comprising M angular locations on a circle of rotation at which to take data, raw sensed data from each of the N sensors;
(b) convert the raw sensed data into a data packet;
(c) store the data packet as a first data packet;
(d) repeat (a) and (b), and store the data packet as a second data packet:
(e) process the first data packet and the second data packet separately to graph into a loading signal and extract signal features there from;
(f) identify a scalar deviation between the first data packet and the second data packet b comparing the loading signals; and
(g) when the scalar deviation is determined to exceed a threshold, generate anomaly information related to the scalar deviation, and transmit the anomaly information to an external maintenance reasoned.

12. The wind turbine of claim 11, wherein the data acquisition pattern further comprises a sensor arrangement defining where the each of the N sensors are located on the wind turbine, and the data acquisition pattern reflects predetermined defect requirements.

13. The wind turbine of claim 12, wherein the anomaly information comprises a defect location on the wind turbine, and the structural health monitoring system is further configured to determine the defect location responsive to processing the scalar deviation with the data acquisition pattern.

14. The wind turbine of claim 13, wherein the anomaly information further comprises an alert stating that a crack exceeding a threshold has been detected.

15. The wind turbine of claim 14, wherein the structural health monitoring system comprises k sensor switching units, arranged based on the sensor arrangement, each of the k sensor switching units operationally coupled to a respective unique subset of the N sensors, and wherein:
each of the k switching units:
(d) acquires raw sensed data from the unique subset of N sensors;
(e) converts its raw sensed data into a respective sub-data packet; and
(f) transmits it's the respective sub-data packet to the processor.

16. The wind turbine of claim 15, wherein the structural health monitoring system is further configured to extract signal features from the first data packet, extract signal features from the second data packet, and compare the extracted signal features from the first data packet to the extracted features from the second data packet.

17. The wind turbine of claim 16, wherein the sensors are piezoelectric (PZT) sensors.

* * * * *